United States Patent [19]

Getz et al.

[11] 4,441,927

[45] Apr. 10, 1984

[54] TANTALUM POWDER COMPOSITION

[75] Inventors: Marlyn F. Getz, Barto; Michael J. Maggio; Billy F. Hitch, both of Boyertown, all of Pa.

[73] Assignee: Cabot Corporation, Boston, Mass.

[21] Appl. No.: 442,027

[22] Filed: Nov. 16, 1982

[51] Int. Cl.³ .............................. B22F 1/00; B22F 3/12
[52] U.S. Cl. .................................. 75/229; 75/0.5 BB; 419/33
[58] Field of Search .................... 419/33; 75/228, 229, 75/0.5 BB, 251

[56] References Cited

U.S. PATENT DOCUMENTS

| | | | |
|---|---|---|---|
| 2,823,116 | 2/1958 | Angier | 419/33 |
| 3,295,951 | 1/1967 | Fincham et al. | 75/0.5 BB |
| 3,473,915 | 10/1969 | Pierret | 419/33 |
| 3,635,693 | 1/1972 | Friedrich et al. | 75/0.5 BB |
| 3,647,415 | 3/1972 | Yano et al. | 75/0.5 BB |
| 3,825,802 | 7/1974 | Kumagai et al. | 317/230 |
| 4,009,007 | 2/1977 | Fry | 29/182.5 |
| 4,017,302 | 4/1977 | Bates et al. | 75/0.5 BB |
| 4,084,965 | 4/1978 | Fry | 75/0.5 BB |
| 4,141,719 | 2/1979 | Hakko | 419/33 |
| 4,149,876 | 4/1979 | Rerat | 75/0.5 BB |
| 4,231,796 | 11/1980 | Hahn et al. | 75/0.5 BB |
| 4,356,028 | 10/1982 | Bates | 75/0.5 BB |

FOREIGN PATENT DOCUMENTS

| | | | |
|---|---|---|---|
| 697222 | 11/1964 | Canada | 75/0.5 BB |
| 52-42453 | 4/1977 | Japan | 419/33 |
| 746061 | 3/1956 | United Kingdom | 75/0.5 BB |

*Primary Examiner*—L. Dewayne Rutledge
*Assistant Examiner*—John J. Zimmerman
*Attorney, Agent, or Firm*—Robert J. Feltovic; Jack Schuman; Lawrence A. Chaletsky

[57] ABSTRACT

An ingot-derived agglomerated tantalum powder composition comprising a select granular tantalum powder and including a critical proportion of a select flaked tantalum powder.

12 Claims, No Drawings

TANTALUM POWDER COMPOSITION

Solid tantalum capacitors, made from tantalum powder, have been a major contributor to the miniaturization of electronic circuits and have made possible the application of such circuits in extreme environments. Tantalum powder capacitors typically are manufactured by compressing tantalum powder to form a pellet, sintering the pellet in a furnace to form a porous body, and then subjecting it to anodization in a suitable electrolyte to form a continuous dielectric oxide film on the sintered body.

Development of tantalum powder suitable for solid capacitors has resulted from efforts by both capacitor producers and tantalum processors to delineate the characteristics required of tantalum powder in order for it to best serve in the production of quality capacitors. Such characteristics include surface area, purity, shrinkage, green strength, and flowability.

First of all, the powder should feature an adequate surface area, since the capacitance of tantalum powder is a function of surface area; the greater the surface area after sintering, the greater the capacitance.

Purity of the powder also is a critical consideration. Metallic and non-metallic contamination tend to degrade the dielectric. High sintering temperatures tend to remove some of the volatile contaminants; however, high temperatures reduce the net surface area and thus the capacitance of the capacitor. Minimizing the loss of surface area under sintering conditions is a requisite in order to maintain the capacitance of the tantalum powder.

The flowability of the tantalum powder and the green strength (mechanical strength of pressed, unsintered powder) are critical parameters for the capacitor producer in order to accommodate efficient production. The flowability of the powder allows smooth die feeding in high speed pressing operations; green strength permits product handling and transport without excessive breakage.

Currently, tantalum powders suitable for utility in high performance capacitors are produced by one of two different methods. The first of these powder production methods involves the sodium reduction of potassium fluotantalate, $K_2TaF_7$; in the second method, powder is produced by hydriding a melted (typically arc or electron beam melted) tantalum ingot, milling the hydrided chips, followed by dehydriding. In general, sodium reduced tantalum powders have provided high capacitance values per gram of powder, while ingot-derived tantalum powders are extremely pure, with contamination levels an order of magnitude lower than sodium reduced powders. Ingot-derived powders typically provide lower D.C. leakage, longer life, and higher voltage capability. Because of the high purity and other characteristics, capacitors made from ingot-derived powder are used in systems where high reliability is a prime requisite. However, more extensive utility of ingot-derived powder would be economically feasible if a powder composition could be developed which provided a higher capacitance per gram of powder.

As discussed above, the capacitance of a tantalum pellet is a direct function of the surface area of the sintered powder. Greater surface area can be achieved, of course, by increasing the grams of powder per pellet, but, cost considerations have dictated that development be focused on means to increase the surface area per gram of powder utilized. Since decreasing the particle size of the tantalum powder produces more surface area per unit of weight, effort has been extended into ways of making the tantalum particles smaller without introducing other adverse characteristics that often accompany size reduction. Three of the major deficiencies of very fine powder are poor flow characteristics, excessive oxygen content, and excessive loss of surface area on sintering.

It was initially found by the inventors that capacitors made from ingot-derived tantalum powder having a particle size less than about 10 microns exhibit very high capacitance when pellets are sintered at relatively low temperatures (e.g., 1400°–1600° C.). However, direct current leakage across the oxide film was unacceptably high at these low sinter temperatures; higher sintering temperatures minimized the leakage problem, but introduced a major reduction in capacitance. Now, according to the present invention, it has been discovered that by blending a critical proportion of a specific flaked ingot-derived tantalum powder into a base of a granular ingot-derived tantalum powder having a particle size less than about 10 microns, a powder composition results which features advantageous properties for capacitor utility.

The composition of the present invention is an agglomerated, ingot-derived tantalum powder composition comprising a granular tantalum powder having a particle size less than about 10 microns and including about 20 to about 40 percent by weight of a flaked tantalum powder having BET surface area of about 0.20 to about 0.40 $m^2/gm$ produced by deforming a granular powder having a particle size ranging from about 10 microns to about 44 microns. The resulting composition has a final oxygen content of less than about 1900 ppm; a Scott Density of greater than about 25 $g/in^3$ (1500 $kg/m^3$); a crush strength of a pressed, unsintered pellet, pressed at 6.0 g/cc, of greater than about 15 lbs (67 N); and, a capacitance of a pellet pressed at 6.0 g/cc, and sintered at 1600° C., of greater than about 7500 CV/g.

Preferably, the ingot-derived, agglomerated tantalum powder composition comprises about 70 percent by weight granular tantalum powder base, and about 30 percent by weight flaked tantalum powder component. It is preferred that the composition have an oxygen content less than about 1800 ppm; a Scott Density greater than about 30 $g/in^3$ (1800 $kg/m^3$); a crush strength of unsintered pellet, dry pressed at 6.0 g/cc, greater than about 20 lbs (89 N); and, a capacitance of a pellet, pressed at 6.0 g/cc and sintered at 1600° C., of at least 7900 CV/g.

The composition of the present invention involves a selected, properly sized and flaked tantalum powder blended and agglomerated with a selected granular tantalum powder of a particular particle size. The agglomerated composition containing a blend of tantalum powders having these different geometries features a surface area available for forming a dielectric oxide film after pressing and sintering operations which is much greater than is possible to achieve with granular powders. This advantage is accomplished because the agglomerated powder composition of the present invention, by virtue of its unique geometry, enables one to form a pellet by dry pressing powder at low mechanical loads. It is theorized that the interlocking effect of the flaked powder produces an anode with high green strength; thus an optimum surface area prior to sintering is obtained. The composition also affords more resistance to surface area loss during sintering than do powders consisting solely of a granular geometry. Use of the subject invention maximizes the surface area that can be obtained and thus permits achieving a higher capacitance per gram of granular ingot-derived powder than has been obtained heretofore.

The ingot-derived powder used in the present composition can be produced using conventional techniques known in the art. The granular powder is made by hydriding tantalum ingot, grinding the tantalum hydride chips to powder, and dehydriding the powder. Mechanical deformation of the granular powder to flake form is accomplished by conventional mechanical techniques using a ball mill, rod mill, roll mill, or the like. The ingot may be prepared by any suitable melt technique; arc melting and electron beam melting are the most common techniques. Electron beam melting is preferred.

The flaked tantalum powder component may be mixed with the granular powder component by conventional mechanical techniques using an ordinary mixer, blender or the like. Agglomeration of the powder composition may be accomplished using conventional heat treatment agglomeration techniques. Typically, agglomeration temperatures range from about 1250° C. to about 1550° C.

One can markedly further enhance the capacitance per gram of the subject composition by adding a phosphorus-containing material to the powder. It is preferred to add this material in the range of about 5 to about 50 parts per million based on elemental phosphorus; about 15 to about 30 ppm phosphorus is particularly preferred. Any of the known phosphorus-containing materials used in the art as tantalum powder additives may be used. This treatment tends to inhibit the rapid loss of surface area which usually occurs when very fine powders are heat treated at temperatures above one half of their melting point.

The invention may be further understood by the following examples which are intended to be illustrative rather than limiting in nature.

Tables 1 to 4 below list properties of agglomerated ingot-derived powder compositions. The testing procedures for the determination of these values are as follows:

Procedure for Capacitance, DC Leakage, Voltage Breakdown Determination (a) Pellet Fabrication:
The tantalum powder was compressed in a commercial pellet press without the aid of binders. The pressed density was 6.0 g/cc using a powder weight of 1.2 g and a diameter of 6.4 mm.

(b) Vacuum Sintering:
The compacted pellets were sintered in a high vacuum of less than $10^{-5}$ torr (0.00133 Pa) for 30 minutes at temperatures in excess of 1500° C.

(c) Anodization:
The sintered pellets were anodized in a forming bath at 90°±2° C. at 100 V DC. The electrolyte was 0.1% phosphoric acid.

The anodization rate was controlled to be 1 volt per minute. After a period of 3 hours at 100 V DC, the pellets were washed and dried.

(d) Testing Conditions:
Capacitance Measurement
Electrolyte—10% $H_3PO_4$
Temperature—21° C.
Charge Transfer Capacitance Determination Procedure for Pellet Strength Determination (a) Anode Fabrication:
The tantalum powder was compressed in a commercial pellet press without the aid of binders. The pressed density was 6.0 g/cc using a powder weight of 1.6 g and a diameter and length of 6.4 mm and 8.4 mm, respectively.

(b) Testing:
The cylindrical pellet is placed between two flat plates with its longitudinal axis parallel to the plates; a steadily increasing force is applied to one of the plates until the pellet breaks. The force is recorded at the point of breakage.

Particle Size

Particle size determinations are measured by laser scattering technique using a Leeds & Northrup Microtrac Particle Analyzer Model No. 7991-02.

Scott Density Determination

ASTM Method B329
Standard method of test for apparent density of refractory metals and compounds by the Scott Volumeter.

OXYGEN ANALYSIS

The oxygen analysis is made using the Leco TC-30 $O_2$ and $N_2$ analyzer which is an inert gas fusion technique.

BET SURFACE AREA

The total surface area of the tantalum flake is measured using a Numinco Orr surface area pore volume analyzer (manufactured by Numec Corporation). The BET (Brunauer-Emmet-Teller) surface areas obtained in this manner include the external surface area as well as the internal surface area contributed by the presence of pores.

In the examples described below, Examples I through X illustrate compositions, according to the invention, consisting of electron beam ingot-derived tantalum powder containing about 60 to about 80 percent by weight of a granular powder having a particle size less than about 10 microns and about 20 to about 40 percent by weight of a flaked tantalum powder having a BET surface area of about 0.20 to about 0.40 m²/gm produced by deforming a granular tantalum powder having a particle size ranging from about 10 microns to about 44 microns. Similar compositions formulated from arc melted ingot-derived tantalum powder exhibit comparable properties.

Examples I–IV are compositions, according to the invention, consisting of 70 percent by weight of an electron beam melted ingot-derived granular tantalum powder having a particle size less than 10 microns, and 30 percent by weight of a flaked electron beam melted ingot-derived tantalum powder having a BET surface area of about 0.24 m²/gm, made by deforming a granular powder having a particle size ranging from 10 to 44 microns. The powder composition was mixed for 10 minutes in a standard Patterson-Kelly V blender. The powder composition was agglomerated by heating it at a temperature of about 1400° C. for about 30 minutes in a vacuum furnace.

Comparative Examples A and C are electron beam ingot-derived tantalum powder compositions consisting of granular tantalum powder having a particle size less than 10 microns. The composition was agglomerated as in Examples I-IV.

Comparative Example B is an electron beam ingot-derived tantalum powder composition consisting of granular tantalum powder having a particle size less than 20 microns. The composition was agglomerated as in Example I-IV.

Example V is an electron beam ingot-derived tantalum powder composition prepared as described in Examples I-IV to which 30 ppm elemental phosphorus has been added.

Examples VI-X are further examples of tantalum powder compositions according to the present invention. Each powder composition differs, however, in regard to the proportions of the granular and flake components. The compositions consist of a base of an electron beam granular tantalum powder having a particle size less than 10 microns, and a flaked electron beam ingot-derived tantalum powder having a BET surface area of about 0.24 $m^2$/gm, made by deforming a granular powder having a particle size ranging from 10 to 44 microns. The powder composition were mixed for 10 minutes in a standard Patterson-Kelly V blender. The compositions were agglomerated by heating it at a temperature of about 1400° C. for about 30 minutes in a vacuum furnace.

Comparative Example D is a composition consisting of 70 percent by weight of an electron beam ingot-derived granular tantalum powder having a particle size less than 10 microns, and 30 percent by weight of a granular electron beam ingot-derived tantalum powder having a particle size range from 10 to 44 microns.

Table 1 illustrates a comparison of the invented composition (I) to tantalum powder compositions containing no flake component. The green strength (crush strength of pressed, unsintered pellets) of Example I is considerably higher than the comparative examples. Capacitances of pellets pressed at a density to achieve a minimum crush strength of at least 20 lbs (89 N) are compared.

Table 2 illustrates several examples of the present invention (II, III, and IV) and a comparative example of a granular tantalum composition containing no flake component. Capacitances of pellets pressed at 6.5 g/cc are reported, since a pellet of comparative Example C pressed at 6.0 g/cc exhibited insufficient mechanical strength to withstand handling and sintering.

Table 3 illustrates the enhanced capacitance accomplished by including phosphorus in the tantalum composition of the present invention. The phosphorus-containing embodiment (Example V) is shown compared to Example 1, previously reported in Table I.

Table 4 illustrates examples of compositions according to the present invention containing proportions of flake tantalum component ranging from 20 to 40 percent by weight. Comparative Example D is a composition with tantalum powder components similar to the subject invention; the critical distinction being that the larger particle size component is granular and has not been deformed to flake form.

TABLE 1

|  | Example No. | | |
| --- | --- | --- | --- |
|  | I | A | B |
| $O_2$ (ppm) | 1700 | 1800 | 1540 |
| Scott Density g/$in^3$ (kg/$m^3$) | 31 (1900) | 62 (3800) | 65 (4000) |
| Crush Strength, lbs. (N) | | | |
| @ 6.0 g/cc | 50 (220) | 2 (9) | 1 (4) |
| @ 7.2 g/cc | — | 20-25 (89-110) | — |
| @ 7.5 g/cc | — | — | 20-25 (89-110) |
| Capacitance | | | |
| Pressed @ (g/cc) | 6.0 | 7.2 | 7.5 |
| Sintered @ (°C.) | 1600 | 1600 | 1600 |
| CV/g | 8050 | 6600 | 5150 |

TABLE 2

|  | Example No. | | | |
| --- | --- | --- | --- | --- |
|  | C | II | III | IV |
| $O_2$ (ppm) | 1800 | 1570 | 1755 | 1870 |
| Scott Density, g/$in^3$ (kg/$m^3$) | 64.3 (3920) | 30.8 (1880) | 26.5 (1620) | 31.9 (1950) |
| Crush Strength, lbs. (N) | | | | |
| (@ 6.0 g/cc) | 3.0 (13) | 24.0 (107) | 35.0 (156) | 21.5 (95.6) |
| Capacitance | | | | |
| Pellet Density (g/cc) | 6.5 | 6.5 | 6.5 | 6.5 |
| Sintering Temp. (°C.) | 1650 | 1650 | 1650 | 1650 |
| CV/g | 6160 | 6800 | 6750 | 6700 |

TABLE 3

|  | Example No. | |
| --- | --- | --- |
|  | I | V |
| Oxygen (ppm) | 1700 | 1660 |
| Scott Density, g/$in^3$ (kg/$m^3$) | 31 (1900) | 22 (1300) |
| Crush Strength @ 6.0 g/cc, lbs (N) | 50 (220) | 30 (130) |
| Pressed @ | 6.0 g/cc | 6.0 g/cc |
| Capacitance | | |
| 1600° C. Sinter × 30 min | 8050 CV/gm | 9500 CV/gm |
| 1650° C. Sinter | 7150 CV/gm | 8300 CV/gm |

TABLE 4

|  | Example No. | | | | | |
| --- | --- | --- | --- | --- | --- | --- |
|  | VI | VII | VIII | IX | X | D |
| Composition: | | | | | | |
| Granular/Flake (% by wt.) | 60/40 | 65/35 | 70/30 | 75/25 | 80/20 | 100/10 |
| $O_2$ (ppm) | 1790 | 1765 | 1695 | 1715 | 1665 | 1390 |
| Scott Density g/$in^3$ (kg/$m^3$) | 28.0 (1710) | 30.9 (1880) | 34.3 (2090) | 37.2 (2270) | 42.0 (2560) | 67.2 (4100) |
| Crush Strength | | | | | | |

TABLE 4-continued

| | Example No. | | | | | |
|---|---|---|---|---|---|---|
| | VI | VII | VIII | IX | X | D |
| @ Pellet Density (g/cc) | 6 | 6 | 6 | 6 | 6 | 6 |
| lbs (N) | 28.5 | 29.5 | 24.5 | 22.5 | 17.5 | 1 |
| | (127) | (131) | (109) | (100) | (77.8) | (4) |
| Capacitance | | | | | | |
| @ Pellet Density (g/cc) | 6 | 6 | 6 | 6 | 6 | 6 |
| @ Sintering Temp. | 1600 | 1600 | 1600 | 1600 | 1600 | 1600 |
| CV/g | 7780 | 7820 | 7710 | 7640 | 7530 | 5950 |

The embodiments of the invention in which an exclusive property or privilege is claimed are defined as follows:

1. An ingot-derived agglomerated tantalum powder composition comprising a granular tantalum powder having a particle size less than about 10 microns and including about 20 to 40 percent by weight of a flaked tantalum powder having a BET surface area of about 0.20 to about 0.40 m$^2$/gm produced by deforming a granular tantalum powder having a particle size ranging from about 10 microns to about 44 microns, said composition having an oxygen content of less than about 1900 ppm, a Scott Density greater than about 25 g/in$^3$, (1500 kg/m$^3$) a crush strength of an unsintered pellet, pressed at 6.0 g/cc, greater than about 15 pounds (67 N), and an anode capacitance, pressed at 6.0 g/cc and sintered at 1600° C., of greater than about 7500 CV/g.

2. The tantalum powder composition of claim 1 including about 30 percent by weight of the flaked tantalum powder.

3. The tantalum powder composition of claim 1 wherein the oxygen content is less than about 1800 ppm.

4. The tantalum powder composition of claim 1 wherein the Scott Density is greater than about 30 g/in$^3$ (1800 kg/m$^3$).

5. The tantalum powder composition of claim 1 wherein the crush strength of a pressed, unsintered pellet, pressed at 6.0 g/cc, is greater than about 20 lbs (89 N).

6. The tantalum powder composition of claim 1 wherein the capacitance of an anode, pressed at 6.0 g/cc and sintered at 1600° C. is greater than about 7900 CV/g.

7. The tantalum powder composition of claim 1 wherein the composition powder is an electron beam ingot-derived agglomerated tantalum powder composition.

8. The tantalum powder composition of claim 7 comprising about 70 percent by weight of a granular tantalum powder having a particle size less than about 10 microns and about 30 percent by weight of a flaked tantalum powder having a BET surface area of about 0.24 m$^2$/gm, produced by deforming a granular tantalum powder having a particle size ranging from about 10 to about 44 microns, said composition having an oxygen content of less than about 1800 ppm, a Scott Density greater than about 30 g/in$^3$ (1800 kg/m$^3$), a crush strength of a dry pressed, unsintered pellet, pressed at 6.0 g/cc, greater than about 20 pounds (89 N), and an anode capacitance, pressed at 6.0 g/cc and sintered at 1600° C., of greater than about 7900 CV/g.

9. The tantalum powder composition of claim 1 including about 5 to about 50 ppm of phosphorus.

10. The tantalum powder composition of claim 9 containing about 15 to about 30 ppm of phosphorus.

11. The tantalum powder composition of claim 8 containing about 5 to about 50 ppm of phosphorus.

12. The tantalum powder composition of claim 11 containing about 15 to about 30 ppm of phosphorus.

* * * * *